United States Patent
Fukuda et al.

(10) Patent No.: US 12,047,349 B2
(45) Date of Patent: Jul. 23, 2024

(54) MULTICAST DELIVERY DESTINATION DESIGNATION METHOD, TRANSMITTING STATION, AND RECEIVING STATION

(71) Applicant: Mitsubishi Electric Corporation, Chiyoda-ku (JP)

(72) Inventors: Kazunobu Fukuda, Chiyoda-ku (JP); Makiko Hiragi, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 119 days.

(21) Appl. No.: 16/981,597

(22) PCT Filed: Jan. 23, 2019

(86) PCT No.: PCT/JP2019/002030
§ 371 (c)(1),
(2) Date: Sep. 16, 2020

(87) PCT Pub. No.: WO2019/187551
PCT Pub. Date: Oct. 3, 2019

(65) Prior Publication Data
US 2021/0021569 A1    Jan. 21, 2021

(30) Foreign Application Priority Data
Mar. 26, 2018    (JP) .................................. 2018-058382

(51) Int. Cl.
*H04L 61/5069*    (2022.01)
*H04B 7/185*    (2006.01)
(Continued)

(52) U.S. Cl.
CPC ..... *H04L 61/5069* (2022.05); *H04B 7/18513* (2013.01); *H04B 7/18517* (2013.01);
(Continued)

(58) Field of Classification Search
CPC ............... H04L 61/2069; H04L 49/201; H04L 2012/5642; H04L 67/26; H04L 12/1859;
(Continued)

(56) References Cited

U.S. PATENT DOCUMENTS 7,549,160 B1 *   6/2009  Podar ............... H04N 21/25816
                                                              713/153
11,540,090 B2 *  12/2022 Han ...................... H04W 76/11
(Continued)

FOREIGN PATENT DOCUMENTS

JP   2000-324155 A   11/2000
JP   2007-208630 A   8/2007
(Continued)

OTHER PUBLICATIONS

International Search Report issued on Mar. 19, 2019 in PCT/JP2019/002030 filed on Jan. 23, 2019.
(Continued)

*Primary Examiner* — Nishant Divecha
(74) *Attorney, Agent, or Firm* — Oblon, McClelland, Maier & Neustadt, L.L.P.

(57) ABSTRACT

Delivery destination designation information, pertaining to a multicast address to which per-multicast-address delivery is requested by a communication terminal connected to a receiving station, is transmitted from the receiving station to a transmitting station, the transmitting station generates a multicast delivery destination table, in which a multicast address to which the delivery is requested from the communication terminal is associated to the communication terminal, from the delivery destination designation information received from a plurality receiving stations, and the transmitting station refers to the multicast delivery destination table when performing multicast transmission via a satellite.

9 Claims, 6 Drawing Sheets

(51) Int. Cl.
  *H04B 7/204* (2006.01)
  *H04L 12/18* (2006.01)
  *H04L 49/201* (2022.01)
  *H04N 21/6405* (2011.01)
  *H04L 12/70* (2013.01)

(52) U.S. Cl.
  CPC .......... *H04B 7/204* (2013.01); *H04L 12/1859* (2013.01); *H04L 2012/5642* (2013.01); *H04L 49/201* (2013.01); *H04N 21/6405* (2013.01)

(58) Field of Classification Search
  CPC ................ H04B 7/18513; H04B 7/18517; H04B 7/204; H04B 7/18584; H04B 7/1851; H04N 21/6405
  See application file for complete search history.

(56) References Cited

U.S. PATENT DOCUMENTS

| | | | | |
|---|---|---|---|---|
| 2006/0209826 A1* | 9/2006 | Kawamura | ............ | H04L 45/16 370/390 |
| 2006/0221960 A1* | 10/2006 | Borgione | ................ | H04L 49/35 370/254 |
| 2008/0232368 A1* | 9/2008 | Ikegami | ................ | H04L 12/185 370/390 |
| 2010/0088426 A1* | 4/2010 | Takemura | .......... | H04N 21/6125 709/231 |
| 2010/0272105 A1* | 10/2010 | Li | .......... | H04L 12/185 370/390 |
| 2013/0182707 A1* | 7/2013 | Angst | .................. | H04L 49/201 370/390 |
| 2018/0375799 A1* | 12/2018 | Liu | .................... | H04L 12/1886 |
| 2019/0260464 A1* | 8/2019 | Roy | .................. | H04B 7/18519 |

FOREIGN PATENT DOCUMENTS

| | | |
|---|---|---|
| JP | 2007-274456 A | 10/2007 |
| JP | 2009-55244 A | 3/2009 |

OTHER PUBLICATIONS

Combined Chinese Office Action and Search Report issued Sep. 24, 2021 in corresponding Chinese Patent Application No. 201980020453.1 (with English Translation and English Translation of Category of Cited Documents), 14 pages.

\* cited by examiner

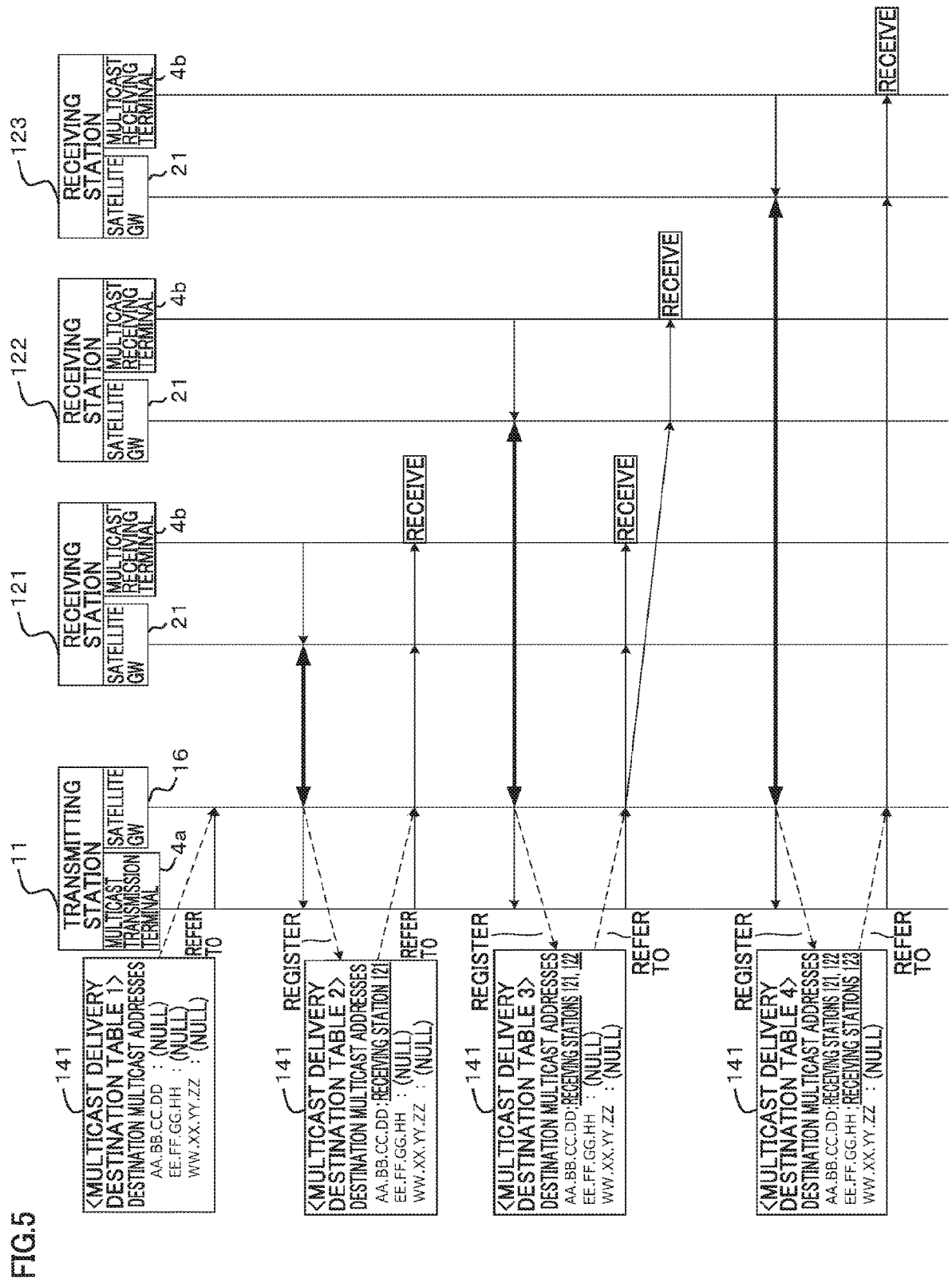

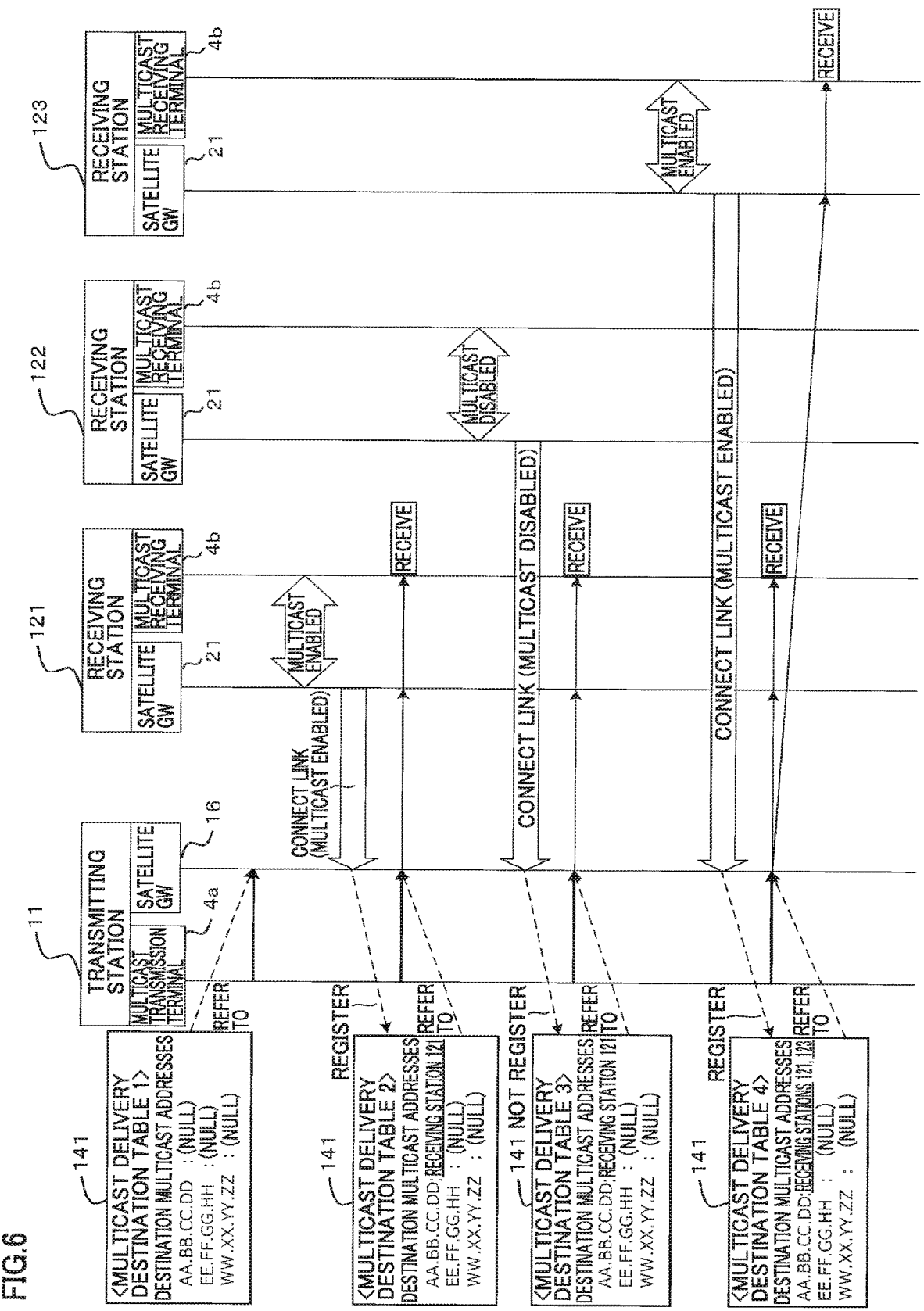

MULTICAST DELIVERY DESTINATION DESIGNATION METHOD, TRANSMITTING STATION, AND RECEIVING STATION

TECHNICAL FIELD

The present disclosure relates to a multicast delivery destination designation method, a transmitting station, and a receiving station for multicast transmissions.

BACKGROUND ART

Conventionally, there is a communication system which achieves optimization of communications bands by dividing destinations of a notification is given into small groups to reduce load on multicast communications (e.g., see PTL 1). In a typical multicast communication, which is handled through a general LAN communication, destinations of the notification can be dynamically changed using protocols, such as IGMP (Internet Group Management Protocol) and MLD (Multicast Listener Discovery) by dividing the destinations of the notification into small groups. This is also applicable to a delivery destination control that has similar flexibility and is performed in multicast communications through satellite links (communications links) of a satellite communications system. Furthermore, in some multicast communications, rather than a station communication device (a network device at a receiving station, such as a switching hub) connected to a network (communications link) unconditionally delivering multicast data (multicast packets) to a communication terminal connected to the station communication device (the receiving station), the station communication device (the network device at the receiving station, such as a switching hub) delivers a multicast packet to a specific communication terminal (e.g., see PTL 2 or 3).

Examples of the satellite communications system include DAMA (Demand Allocation Multiple Access) system (e.g., see PTL 4). In the DAMA satellite communications system, a control station allocates lines of the earth station to multiple earth stations (a transmitting station or a receiving station), and the earth stations perform data communications (IP communications) via satellite links. In DAMA, links are allocated when needed, and the links can be deallocated after use for reallocation. Thus, DAMA has a characteristic that the link traffic can be ensured. Due to such a characteristic, conventionally, the DAMA satellite communications system is independent of land lines, such as a cellular phone link, even in emergencies or in disasters, and thus is widely used for disaster prevention applications, as being suitable for the emergency communications.

CITATION LIST

Patent Literature

PTL 1: Japanese Patent Laying-Open No. 2000-324155
PTL 2: Japanese Patent Laying-Open No. 2007-274456
PTL 3: Japanese Patent Laying-Open No. 2009-55244
PTL 4: Japanese Patent Laying-Open No. 2007-208630

SUMMARY OF INVENTION

Technical Problem

However, a problem with a system which performs the multicast data communications through the satellite communications is that the system is required to reduce the transfer of unnecessary multicast data (multicast packets) to a receiving station over a satellite link. This is because if the speed of the satellite link is low (e.g., spread spectrum), the transfer of unnecessary multicast data leads to constrain on the link. In the conventional DAMA satellite communications system, the multicast data is transferred to all the receiving stations that are connected to the transmitting station over satellite links, and unnecessary multicast data is discarded at each receiving station. Therefore, if the bandwidth for satellite links is narrow as described above, and a packet is transferred even to receiving stations that do not need to receive multicast data, the bandwidth of the satellite link can be constrained, resulting in impeding communications other than the multicasting.

The present disclosure is made to solve the problems as described above, and relates to a multicast delivery destination designation method, a transmitting station, and a receiving station which achieve reduced transmission of unnecessary multicast packets on communications links via satellite.

Solution to Problem

A multicast delivery destination designation method according to the present disclosure is a multicast delivery destination designation method for designating a delivery destination between a transmitting station which performs a multicast transmission via a satellite and a plurality of receiving stations, the multicast delivery destination designation method including: a delivery destination designating step of transmitting delivery destination designation information from the receiving station to the transmitting station, the delivery destination designation information pertaining to a multicast address to which per-multicast-address delivery is requested by a communication terminal connected to the receiving station; a delivery destination table generating step of generating, by the transmitting station, a multicast delivery destination table, in which a multicast address to which the delivery is requested from the communication terminal is associated to the communication terminal, from the delivery destination designation information received from the plurality of receiving stations; and a delivery destination referencing step of referring to the multicast delivery destination table when the transmitting station performs the multicast transmission via the satellite.

A transmitting station according to the present disclosure is a transmitting station for performing multicast transmission to a plurality of receiving stations via a satellite, the transmitting station including: a transmitting station transceiver that receives delivery destination designation information from the plurality of receiving stations, the delivery destination designation information pertaining to a multicast address to which per-multicast-address delivery is requested by a communication terminal connected to the receiving station; a delivery destination table memory device that, based on the delivery destination designation information received from the plurality of receiving stations, generates and stores a multicast delivery destination table in which a multicast address to which the delivery is requested from the communication terminal is associated to the communication terminal, wherein the transmitting station transceiver refers to the multicast delivery destination table and transmits a multicast packet to the receiving station which is a delivery destination.

A receiving station according to the present disclosure is a receiving station which is one of a plurality of receiving stations which receive multi cast transmission from a transmitting station via a satellite, the receiving station including: a delivery destination designation information memory device storing delivery destination designation information pertaining to a multicast address to which per-multicast-address delivery is requested by a communication terminal connected to the receiving station; and a receiving station transceiver that transmits the delivery destination designation information to the transmitting station and receives a transmitted multicast packet based on association between the multicast address to which the delivery is requested by the communication terminal and the communication terminal.

Advantageous Effects of Invention

As described above, according to the present disclosure, a multicast delivery destination designation method, a transmitting station, and a receiving station can be obtained, which achieve reduced transmission of unnecessary multicast packets by associating a multicast address to which the delivery is requested and a communication terminal for each communication terminal.

BRIEF DESCRIPTION OF DRAWINGS

FIG. 5 is an example sequence diagram of the communication system according to Embodiment 1 of the present disclosure.

FIG. 6 is an example sequence diagram of a communication system according to Embodiment 2 of the present disclosure.

DESCRIPTION OF EMBODIMENTS

Embodiment 1

Figure 1:
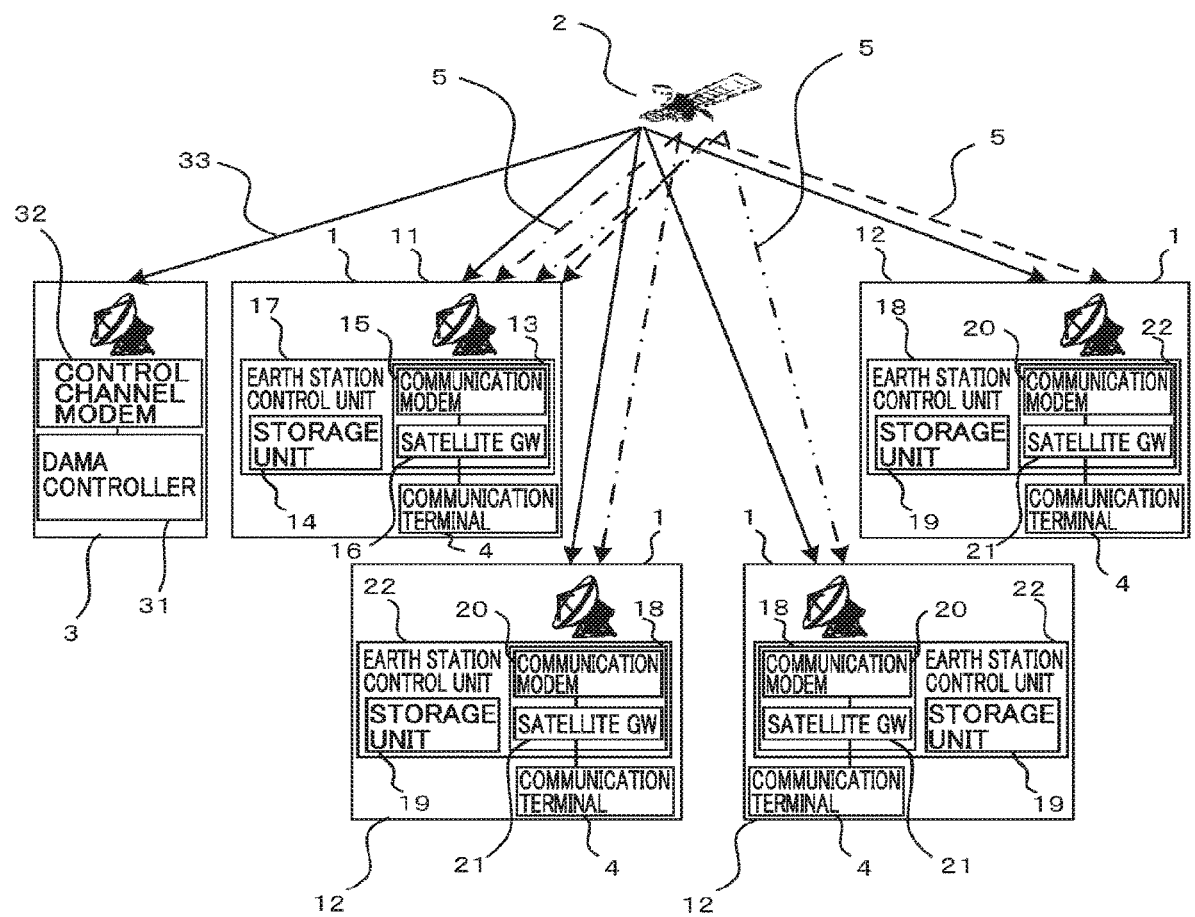
FIG. 1 is a functional block diagram of a communication system according to Embodiment 1 of the present disclosure.

Hereinafter, a communication system, a communication method, a multicast delivery destination designation method, a transmitting station, and a receiving station, according to Embodiment 1 of the present disclosure, will be described, with reference to FIGS. 1 through 5. In the figures, the same reference signs are used to refer to the same or like parts, and the detailed description thereof will be omitted. The communication system according to Embodiment 1 is suitable for a DAMA satellite communications system. Description will be given, with reference to a DAMA satellite communications system. The communication system according to Embodiment 1 has multiple earth stations 1, including a transmitting station 11 and a receiving station 12, a satellite 2 (satellite station 2), and a control station 3. Communication terminals 4 (multicast transmission terminal 4a, a multicast receiving terminal 4b), which are respectively connected to transmitting station 11 and receiving station 12, may be included in the communication system according to Embodiment 1.

In FIGS. 1 through 5, in control station 3, a DAMA controller 31 receives via a control channel modem 32 a request for allocation of links of the satellite communications system from an earth station 1 through a control channel 33 via satellite 2. DAMA controller 31 notifies, through control channel 33, earth station 1 of a communications link 5 allocated to earth station 1. Earth stations 1, each having a link allocated thereto, perform multicast communications with each other. Transmitting station 11 is one of earth stations 1 and performs multicast transmission to multiple receiving stations 12 via satellite 2. Since a request for allocation of a communications link is made through control channel 33, control channel 33 is also called a CSC channel 33. CSC stands for common signaling channel.

In FIGS. 1 through 5, transmitting station 11 has a transmitting station transceiver unit 13 (transceiver unit 13), a delivery destination table storage unit 14 (storage unit 14), a communication modem 15 (modem 15), a satellite gateway 16 (satellite GW 16), and an earth station control unit 17 (transmitting station 11 side). Earth station control unit 17 controls transmitting station transceiver unit 13 (transceiver unit 13) and delivery destination table storage unit 14. Earth station control unit 17 controls the operation of earth station 1 serving as earth station 1 (requesting for allocation of a link of the satellite communications system) and the operation of earth station 1 serving as transmitting station 11. Receiving station 12 has a receiving station transceiver unit 18 (transceiver unit 18), a delivery destination designation information storage unit 19 (storage unit 19), a communication modem 20 (modem 20), a satellite gateway 21 (satellite GW 21), and an earth station control unit 22 (receiving station 12 side). Earth station control unit 22 controls receiving station transceiver unit 18 (transceiver unit 18) and delivery destination designation information storage unit 19 (storage unit 19). Earth station control unit 22 controls the operation of earth station 1 serving as earth station 1 (requesting for allocation of a link of the satellite communications system) and the operation of earth station 1 serving as receiving station 12.

Figure 2:
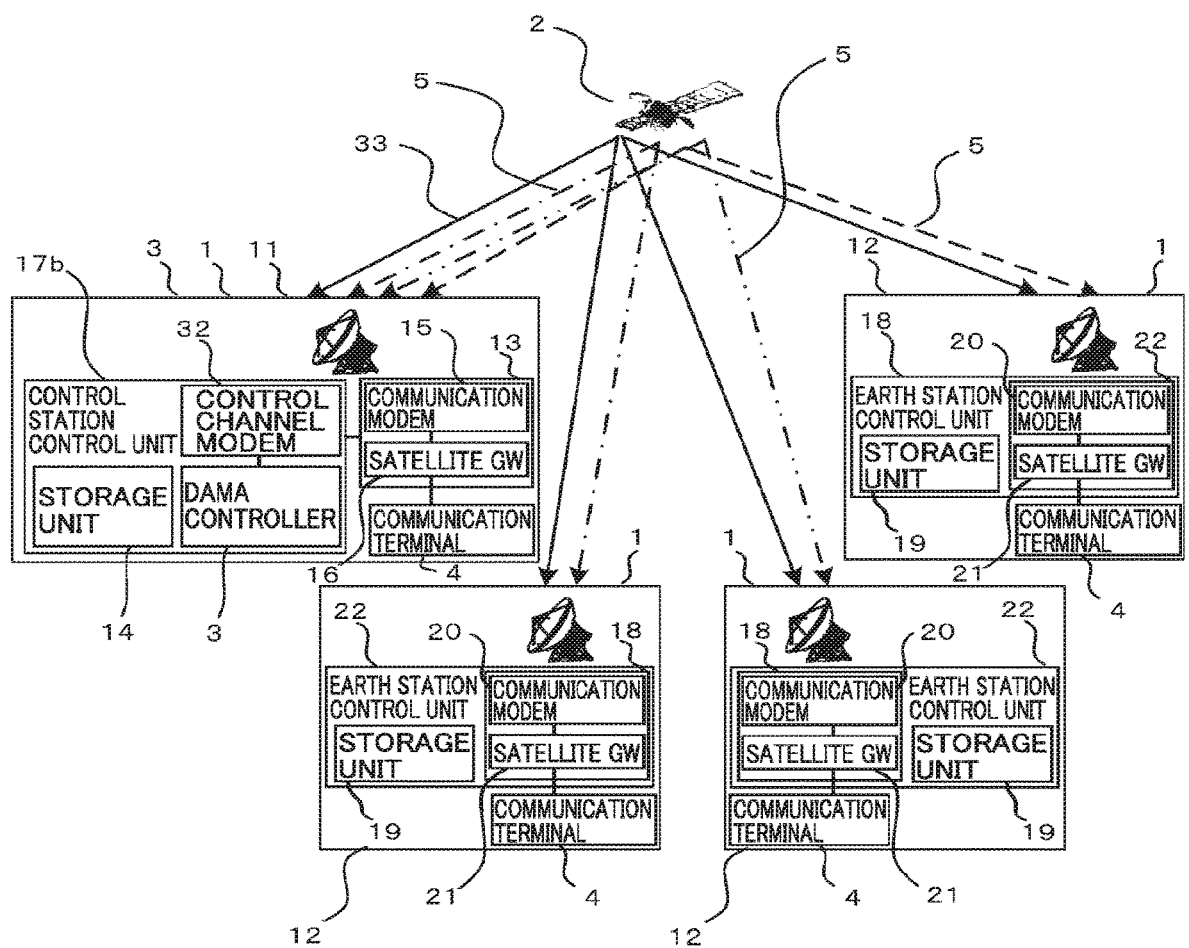
FIG. 2 is a functional block diagram of the communication system according to Embodiment 1 of the present disclosure (a variation).

The functional block diagram of the communication system according to Embodiment 1, shown in FIG. 2, is a variation of the functional block shown in FIG. 1. FIG. 2 illustrates a case where control station 3 has the functionality of earth station 1 (transmitting station 11). In other words, in transmitting station 1 in this case, a control station control unit 17b has the functionality of control station 3, in addition to the functionality of earth station control unit 17. While the case where control station 3 has the functionality of earth station 1 (receiving station 12) is not shown in the figure, in receiving station 12 in this case, a control station control unit 18b has the functionality of control station 3, in addition to the functionality of earth station control unit 17.

Transmitting station transceiver unit 13 receives delivery destination designation information 191 from multiple receiving stations. Delivery destination designation information 191 pertains to a multicast address to which per-multicast-address delivery is requested by a communication terminal 4 (multicast receiving terminal 4b) connected to receiving station 12. Based on delivery destination designation information received from multiple receiving stations 12, delivery destination table storage unit 14 generates and stores a multicast delivery destination table 141 in which a multicast address to which the delivery is requested from communication terminal 4 (multicast receiving terminal 4b) is associated to communication terminal 4 (multicast receiving terminal 4b).

Transmitting station transceiver unit 13 is connected to a communication terminal 4 (multicast transmission terminal 4a). Transmitting station transceiver unit 13 has communication modem 15 (modem 15) and satellite GW 16 (satellite gateway 16). Communication modem 15 (modem 15) is connected to an antenna included in transmitting station 11, and transmits and receives data (delivery destination designation information 191, multicast packets) via communications link 5 (satellite link 5). Satellite GW 16 functions as a gateway to communications link 5 (satellite link 5). Transmitting station transceiver unit 13 refers to multicast delivery destination table 141, and transmits a multicast packet from communication terminal 4 (multicast transmission terminal 4a) to receiving station 12 which is a delivery destination.

Figure 3:
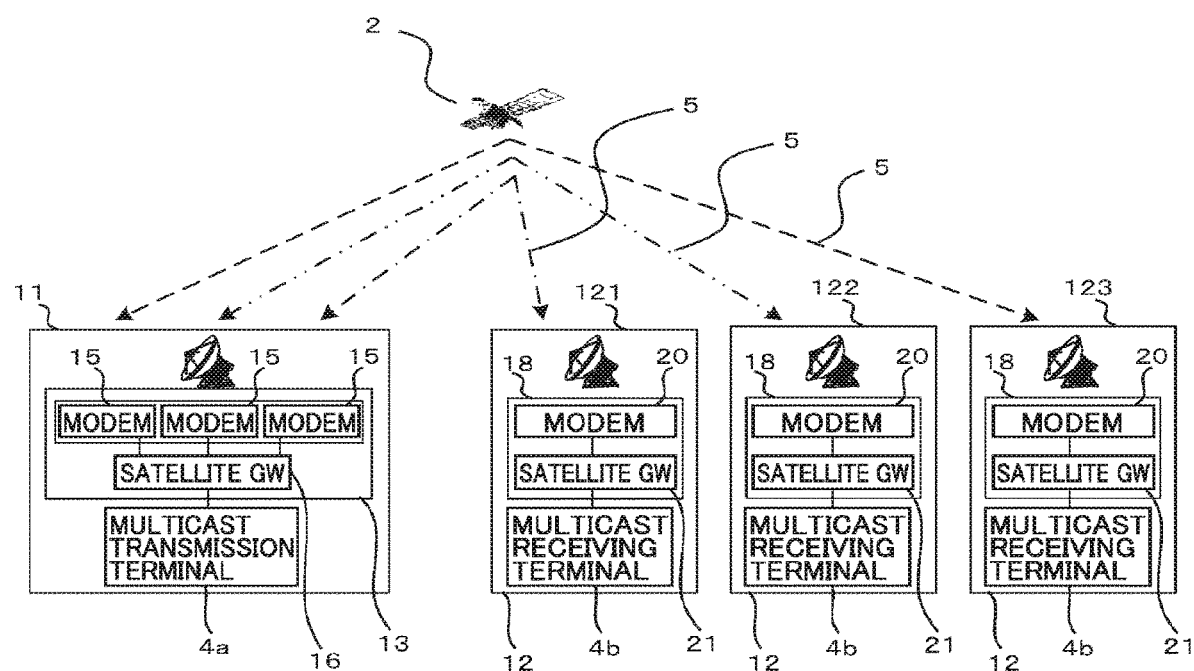
FIG. 3 is a functional block diagram of the communication system according to Embodiment 1 of the present disclosure (after links are allocated).

Receiving station 12 is one of receiving stations which receive the multicast transmission from transmitting station 11 via satellite 2. Receiving stations will be collectively referred to as a receiving station 12. Receiving stations include n receiving stations, including a receiving station 121, a receiving station 122, . . . a receiving station 12n-1, and a receiving station 12n, where n is a positive integer. Description will be given herein, with reference to n=3. Receiving station transceiver unit 18 is connected to communication terminal 4 (multicast receiving terminal 4b). Receiving station transceiver unit 18 has communication modem 20 (modem 20) and satellite GW 21 (satellite gateway 21). Communication modem 20 (modem 20) is connected to an antenna included in receiving station 12, and transmits and receives data (delivery destination designation information 191, multicast packets) via communications link 5 (satellite link 5). In FIGS. 1 through 3, communications link 5 (satellite link 5) indicated by the dot-dash line is a link allocated between transmitting station 11 and receiving station 121. Communications link 5 (satellite link 5) indicated by the dot-dot-dash line is a link allocated between transmitting station 11 and receiving station 122. Communications link 5 (satellite link 5) indicated by the dashed line is a link allocated between transmitting station 11 and receiving station 123.

Delivery destination designation information storage unit 19 stores delivery destination designation information 191 which pertains to a multicast address to which per-multicast-address delivery is requested by communication terminal 4 (multicast receiving terminal 4b) connected to the local receiving station 12. Receiving station transceiver unit 18 transmits delivery destination designation information 191 to transmitting station 11, and receiving station 12 receives the multicast packet transmitted from transmitting station 11 based on the association (multicast delivery destination table 141) between (i) the multicast address requested by communication terminal 4 (multicast receiving terminal 4b) included in the local receiving station 12 and other receiving stations (receiving station 121, . . . , receiving station 12n) for delivery and (ii) communication terminal 4 (multicast receiving terminal 4b).

Referring to FIGS. 1 and 2, link allocation in the communication system according to Embodiment 1 (a communication method) will be described. Earth station 1 sends to control station 3 a request for allocation of a link through control channel 33. As described above, control station 3 receives the request for allocation of a link of the satellite communications system from earth station 1 through control channel 33. Control station 3 notifies earth station 1 of communications link 5 that is allocated to earth station 1 (link allocation step). Next, referring to FIGS. 3 through 5, designation of a multicast delivery destination (a multicast delivery destination designation method according to Embodiment 1) in the communication system (the communication method) after the link is allocated, according to Embodiment 1, will be described.

Figure 4:
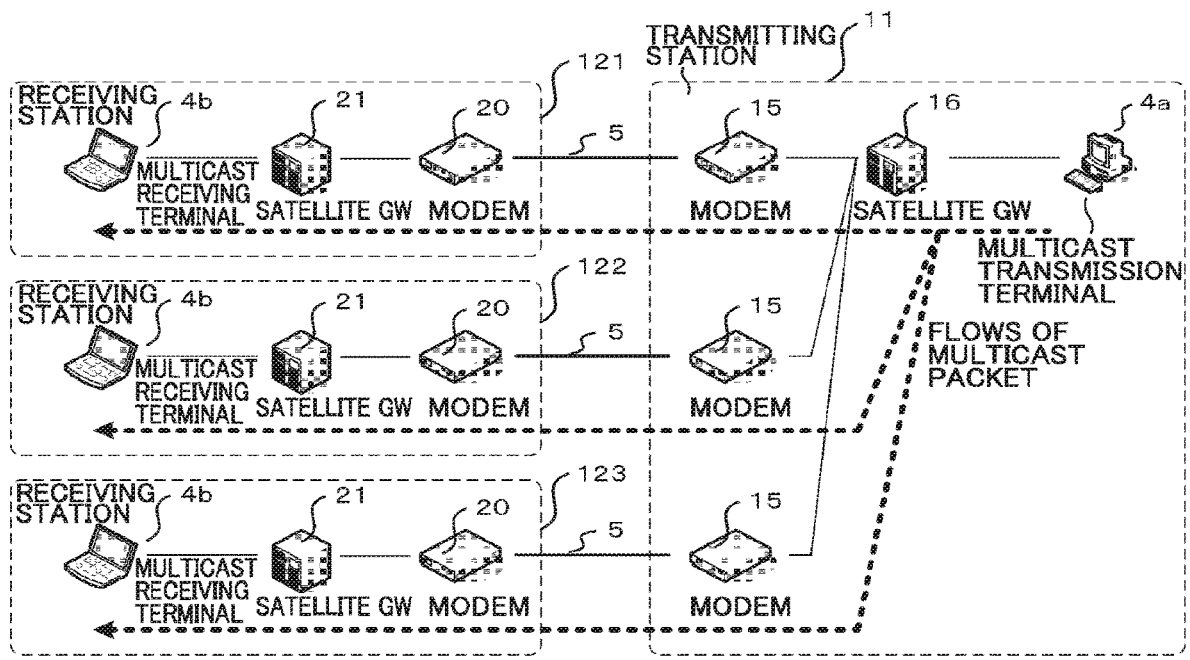
FIG. 4 is a functional block diagram of the communication system according to Embodiment 1 of the present disclosure (after links are allocated).

Transmitting station 11, shown in FIGS. 3 and 4, is connected to multicast transmission terminal 4a which generates and transmits multicast data. Multicast transmission terminal 4a may be a part of transmitting station 11. Modem 15 is provided for each of receiving station 121, receiving station 122, and receiving station 123, and transmits/receives data to/from satellite 2. Satellite GW 16 sorts the transmission data to an appropriate communications link 5 (satellite link 5). Receiving station 12 (receiving station 121, receiving station 122, receiving station 123), shown in FIGS. 3 and 4, is connected to multicast receiving terminal 4b which receives multicast data. Multicast receiving terminal 4b may be a part of receiving station 12. Modem 20 transmits/receives data to/from satellite 2. Satellite GW 21 transfers the received data to multicast receiving terminal 4b. For multicast IP communications in which multicast transmission terminal 4a uses communications link 5 (satellite link 5), satellite GW functions as a gateway and transmits data to receiving station 12 via transmitting station transceiver unit 13. FIG. 4 illustrates a case where a multicast packet is delivered (transmitted) to receiving station 121, receiving station 122, and receiving station 123. The directions indicated by the dashed lines in FIG. 4 are of flows of the multicast packet.

An example sequence of the multicast delivery destination designation method according to Embodiment 1 is as shown in FIG. 5. In other words, FIG. 5 shows an example sequence of designation of a delivery destination between transmitting station 11, which performs the multicast transmission via satellite 2, and multiple receiving stations 12. Initially, prior to entering the example sequence, receiving station 12 transmits delivery destination designation information 191 to transmitting station 11 (delivery destination designating step), the delivery destination designation information 191 pertaining to a multicast address to which per-multicast-address delivery is requested by multicast receiving terminal 4b connected to receiving station 12. Specifically, receiving station 12 issues delivery destination designation information 191 indicating that multicast receiving terminal 4b wishes for reception in a specific multicast address. Subsequently, in receiving station 12, satellite GW 21 transfers delivery destination designation information 191 to transmitting station 11 via modem 20 and through satellite link 5. Delivery destination designation information 191 describes a multicast address by which multicast receiving terminal 4b wishes to receive delivery. Delivery destination designation information 191 is stored in delivery destination designation information storage unit 19 (storage unit 19).

The delivery destination designating step is performed at least after communications link 5 has been established between transmitting station 11 and multiple receiving stations 12 via satellite 2. In other words, receiving station transceiver unit 18 transmits delivery destination designation information at least after communications link 5 to transmitting station 11 via satellite 2 has been established. Similarly, transmitting station transceiver unit 13 receives delivery destination designation information 191 at least after communications link 5 to receiving station 12 via satellite 2 has been established. If the delivery destination designating step is performed during the initial communication after communications link 5 is established, transmission of unnecessary multicast packets can be reduced immediately after communications link 5 is established. In this case, receiving station transceiver unit 18 transmits delivery destination designation information 191 during the initial communication after communications link 5 is established. Similarly, transmitting station transceiver unit 13 receives delivery destination designation information 191 during the initial communication after communications link 5 is established.

FIG. 5 also depicts multicast delivery destination table 141 when no delivery destination designation information 191 is present. In other words, even when the delivery destination designating step is not present (the initial state), a delivery destination referencing step, described below, may be performed. From delivery destination designation information 191 received from multiple receiving stations 12, transmitting station 11 generates multicast delivery destination table 141 in which a multicast address to which the delivery is requested from multicast receiving terminal 4b is associated to multicast receiving terminal 4b (delivery destination table generating step). Specifically, upon reception of delivery destination designation information 191 from receiving station 12, satellite GW 16, included in transmitting station 11, reads the multicast address written in delivery destination designation information 191 and a receiving station 12 corresponding to this multicast address is registered with multicast delivery destination table 141. Note that the delivery destination designating step may be performed each time the delivery destination designation information 191 is changed. In other words, receiving station transceiver unit 18 may transmit delivery destination designation information 191 each time the delivery destination designation information 191 is changed.

Multicast delivery destination table 141 also includes association, for each multicast receiving terminal 4b, between a multicast address to which the delivery is requested and receiving station 12 connected to multicast receiving terminal 4b. Satellite GW 16, included in transmitting station 11, manages multicast delivery destination table 141, and has a functionality of transferring the multicast packet to a modem within transmitting station 11. FIGS. 1 and 2 illustrate this functionality of satellite GW 16 separately, as delivery destination table storage unit 14 (storage unit 14). In multicast delivery destination table 141 shown in FIG. 5, correspondence is written between a multicast address, which is a destination of the multicast packet, and receiving station 12 wishing to receive delivery in the multicast address. In the initial state, no receiving station 12 is registered for any multicast address in <multicast delivery destination table 1> shown in FIG. 5.

When transmitting station 11 performs multicast transmission via satellite 2, multicast delivery destination table 141 is referred to (the delivery destination referencing step). Specifically, when multicast transmission terminal 4a transmits a multicast packet, satellite GW 16, included in transmitting station 11, reads (refers to) a destination address of the multicast packet. The multicast delivery destination designation method according to Embodiment 1 may further include a delivery step. The multicast delivery destination designation method which includes the delivery step can also be said to be a communication method. A link allocation step may be added to the communication method. The delivery step transmits the multicast packet to receiving station 12 which is a delivery destination obtained from multicast delivery destination table 141 read (referred to) in the delivery destination referencing step.

In the delivery step, multicast delivery destination table 141 is searched for an address, and, if receiving station 12 (multicast receiving terminal 4b) is registered, a multicast packet is transferred to this receiving station 12, but not to any other stations. In the delivery step, if no receiving station 12 (multicast receiving terminal 4b) is registered for the address included in multicast delivery destination table 141, satellite GW 16, included in transmission station 11, discards the multicast packet. In other words, transmitting station transceiver unit 13 refers to multicast delivery destination table 141, and discards the multicast packet if no delivery destination is found.

The multicast delivery destination designation method according to Embodiment 1 will be described in more detail, with reference to FIG. 5. FIG. 5 illustrates four multicast delivery destination tables 141: <multicast delivery destination table 1>; <multicast delivery destination table 2>; <multicast delivery destination table 3>; and <multicast delivery destination table 4>. FIG. 5 illustrates a case where a form (pre-registration form) in which three multicast addresses (destination multicast addresses) assumed are pre-registered, which are AA.BB.CC.DD, EE.FF.GG.HH, and WW.XX.YY.ZZ. Multicast delivery destination table 141 is not limited thereto. Multicast delivery destination table 141 may not take the form of pre-registration, and may have zero entry at the initial state, and a new multicast address may be registered with the table (multicast delivery destination table 141) (an additional registration form). Although not shown, in the additional registration form, the multicast address itself may be registered with multicast delivery destination table 141 when delivery destination designation information 191 is added. Doing so does not require previously assuming the multicast addresses themselves, and gives flexibility to addition/removal of receiving station 12 to/from multicast delivery destination table 141.

Next, the pre-registration form will be described. Delivery destination designation information 191 is added one after another to <multicast delivery destination table 1>, <multicast delivery destination table 2>, <multicast delivery destination table 3>, and <multicast delivery destination table 4>. Receiving stations 12 added are indicated by the underlines. Null multicast addresses are indicated as (null). The <multicast delivery destination table 1> illustrates that no receiving station 12 is registered with multicast delivery destination table 141, that is, no listener is present. Thus, transmitting station 11 discards the multicast packet.

The <multicast delivery destination table 2> illustrates that multicast receiving terminal 4b connected to receiving station 121 is registered as a listener for the multicast address AA.BB.CC.DD. Initially, receiving station 121 communicates with transmitting station 11 and has multicast delivery destination table 141 updated so that the multicast address AA.BB.CC.DD is registered as delivery destination designation information 191. This allows transfer destination designation information to be shared between transmitting station 11 and receiving station 121. When a multicast packet needs to be transmitted to the multicast address AA.BB.CC.DD, transmitting station 11 then refers to multicast delivery destination table 141. Since receiving station 121 is registered for the multicast address AA.BB.CC.DD, transmitting station 11 knows that a listener is present at receiving station 121, and transmits the multicast packet from multicast transmission terminal 4a to receiving station 121. Receiving station 121 (multicast receiving terminal 4b) receives this multicast packet.

The <multicast delivery destination table 3> illustrates that multicast receiving terminal 4b connected to receiving station 122 is additionally registered as a listener for the multicast address AA.BB.CC.DD. Initially, receiving station 122 communicates with transmitting station 11 and has multicast delivery destination table 141 updated so that the multicast address AA.BB.CC.DD is registered as delivery destination designation information 191. This allows transfer destination designation information to be shared between transmitting station 11 and receiving station 122. When a multicast packet needs to be transmitted to the multicast address AA.BB.CC.DD, transmitting station 11 then refers to multicast delivery destination table 141. Since receiving station 121 and receiving station 122 are registered for the multicast address AA.BB.CC.DD, transmitting station 11 knows that a listener is present at receiving station 121 and receiving station 122, and transmits the multicast packet from multicast transmission terminal 4a to receiving station 121 and receiving station 122. Receiving station 121 (multicast receiving terminal 4b) and receiving station 122 (multicast receiving terminal 4b) receive this multicast packet.

The <multicast delivery destination table 4> illustrates that multicast receiving terminal 4b connected to receiving station 123 is additionally registered as a listener for the multicast address EE.FF.GG.HH. Initially, receiving station 123 communicates with transmitting station 11 and has multicast delivery destination table 141 updated so that delivery destination designation information 191 is registered for the multicast address EE.FF.GG.HH. This allows transfer destination designation information to be shared between transmitting station 11 and receiving station 123. When a multicast packet needs to be transmitted to the multicast address EE.FF.GG.HH, transmitting station 11 then refers to multicast delivery destination table 141. Since receiving station 123 is registered for the multicast address EE.FF.GG.HH, transmitting station 11 knows that a listener is present at receiving station 123, and transmits the multicast packet from multicast transmission terminal 4a to receiving station 123. Receiving station 123 (multicast receiving terminal 4b) receives this multicast packet. Consequently, no unnecessary multicast packet itself is transmitted to receiving station 121 and receiving station 122 over communications link 5. When a multicast packet needs to be transmitted to the multicast address AA.BB.CC.DD, the process similar to that described with respect to <multicast delivery destination table 3> is performed. Consequently, no unnecessary multicast packet itself is transmitted to receiving station 123 over communications link 5.

While the delivery destination designating step may be performed each time the delivery destination designation information 191 is changed (including an update), if receiving station 12 has changed delivery destination designation information 191 (including an update) after transmitting station 11 has performed the multicast communication, the delivery destination designating step may proceed as follows. If due to a change in delivery destination designation information 191, the multicast packet, transmitted by transmitting station 11, does not belong to the multicast address to which per-multicast-address deliver is requested by multicast receiving terminal 4b, receiving station transceiver unit 18 discards the multicast packet. In response to the multicast packet, transmitted by transmitting station 11, being discarded, as a trigger, receiving station transceiver unit 18 may further transmit the changed delivery destination designation information 191 to transmitting station 11.

As such, the communication system, the communication method, the multicast delivery destination designation method, the transmitting station, and the receiving station, according to Embodiment 1, relate to the satellite communications system which performs the multicast communication in which multicast data is broadcasted over satellite links 5 while transmitting station 111 and receiving stations 12 of the multicast data are being connected over satellite links 5. In accordance with a multicast data delivery request from receiving station 12, transmitting station 11 can restrict the destination to which the multicast data is transferred. The multicast data delivery request from receiving station 12 can be made upon the connection between transmitting station 111 and receiving station 12 over satellite link 5, and the destination to which the multicast data is transferred can be restricted by transmitting station 11 since a moment the connection between transmitting station 111 and receiving station 12 has been made over satellite link 5. As such, in accordance with a transfer request from receiving station 12, transmitting station 11 selects the destination to which transmitting station 11 transfers multicast data, eliminating the transfer of unnecessary multicast data to the receiving station, thereby reducing an amount of transfer of multicast data to satellite link 5 and increasing the satellite link utilization efficiency.

Embodiment 2

In the following, a communication system, a communication method, a multicast delivery destination designation method, a transmitting station, and a receiving station, according to Embodiment 2 of the present disclosure, will be described, with reference to FIG. 6. In the figures, the same reference signs are used to refer to the same or like parts, and the detailed description thereof will not be omitted. Embodiments 1 and 2 are the same in the following respects. Satellite GW 16 (delivery destination table storage unit 14), included in transmitting station 11, manages multicast delivery destination table 141 and has the functionality of transferring a multicast packet to modem 15 within transmitting station 11 in accordance with the content of multicast delivery destination table 141. In multicast delivery destination table 1411, correspondence is written between a multicast address, which is the destination of the multicast packet, and receiving station 12 wishing to receive delivery in the multicast address. In the initial state, no receiving station is registered for any multicast address in multicast delivery destination table 1411.

Differences of Embodiment 2 from Embodiment 1 will be mainly described. Configurations of Embodiment 2 without further description are common to Embodiment 1. The communication system, the communication method, the multicast delivery destination designation method, the transmitting station, and the receiving station according to Embodiment 2 receive a notification that the multicast is enabled or the multicast is disabled from all receiving stations 12 during the initial communication for the connection between receiving stations 12 and transmitting station 11 over links. As receiving station 12 issues delivery destination designation information 191 indicating that multicast receiving terminal 4b wishes to receive delivery in a specific multicast address, satellite GW 21, included in receiving station 12, holds delivery destination designation information 191. During the initial communication for the connection between receiving station 12 and transmitting station 11 over satellite link 5, which is made upon the establishment of the link, receiving station 12 notifies transmitting station 11 of as to whether receiving station 12 wishes for multicast reception (the multicast is enabled, the multicast is disabled) and a multicast address to which the delivery the multicast receiving terminal wishes to receive is addressed.

Upon receipt of information that the multicast is enabled at receiving station 12 during the initial communication for the connection of satellite link 5 to receiving station 12, satellite GW 16, included in transmitting station 11, reads the multicast address written in the information and registers this receiving station 12 with multicast delivery destination table 141. If satellite GW 15, included in transmitting station 11, receives information indicating that the multicast is disabled at receiving station 12 during the initial communication for the connection of satellite link 5 with receiving station 12, satellite GW 15, included in transmitting station 11, does nothing. Satellite GW 15 also stores receiving station 12 at which the multicast is disabled. In other words, the information indicating that the multicast is enabled can be said to be delivery destination designation information 191. The information indicating that the multicast is disabled can be said to be null delivery destination designation information 191.

When multicast transmission terminal 4a transmits a multicast packet, satellite GW 15, included in transmitting station 11, reads (refers to) a destination address of the multicast packet, and searches multicast delivery destination table 141 for the address. If receiving station 12 is registered for the address, satellite GW 15, included in transmitting station 11, transfers the multicast packet to this receiving station 12, but not to any other stations. If the receiving station is not registered for the address in multicast delivery destination table 141, satellite GW 15, included in transmitting station 11, discards the multicast packet.

The multicast delivery destination designation method according to Embodiment 2 will be described in more detail, with reference to FIG. 6. FIG. 6 illustrates four multicast delivery destination tables 141: <multicast delivery destination table 1>; <multicast delivery destination table 2>; <multicast delivery destination table 3>; and <multicast delivery destination table 4>. FIG. 6 illustrates a case where a form (pre-registration form) in which three multicast addresses (destination multicast addresses) assumed are pre-registered, which are AA.BB.CC.DD, EE.FF.GG.HH, and WW.XX.YY.ZZ. Similarly to Embodiment 1, multicast delivery destination table 141 may take the additional registration form described in Embodiment 1, rather than the pre-registration form. In the additional registration form, the multicast address, as is, is added from the information indicating that the multicast is enabled (delivery destination designation information 191) to multicast delivery destination table 141. Thus, the additional registration form has characteristics that it does not require previously assuming a multicast address and does not unnecessary increase the number of multicast addresses themselves. In particular, the characteristics of the additional registration form include a characteristic that when the information indicating that the multicast is disabled at receiving station 12 is obtained from receiving station 12 later on or upon reconnection between transmitting station 11 and receiving station 12 over the link, the number of registered multicast addresses is not increased too many by removing a multicast address itself corresponding to the information indicating that the multicast is disabled.

Next, the pre-registration form will be described. Delivery destination designation information 191 is added one after another to <multicast delivery destination table 1>, <multicast delivery destination table 2>, <multicast delivery destination table 3>, and <multicast delivery destination table 4> during the initial communication for the connection of satellite link 5 to receiving station 12. Receiving stations 12 added are indicated by the underlines. Null multicast addresses are indicated as (null). The <multicast delivery destination table 1> illustrates that no receiving station 12 is registered with multicast delivery destination table 141, that is, no listener is present. Thus, transmitting station 11 discards the multicast packet.

The <multicast delivery destination table 2> illustrates that multicast receiving terminal 4b connected to receiving station 121 is registered as a listener for the multicast address AA.BB.CC.DD. Initially, receiving station 121 communicates with transmitting station 11 and has multicast delivery destination table 141 updated so that the information indicating that the multicast is enabled at receiving station 121 is registered for the multicast address AA.BB.CC.DD. When a multicast packet needs to be transmitted to the multicast address AA.BB.CC.DD, transmitting station 11 then refers to multicast delivery destination table 141. Since receiving station 121 is registered for the multicast address AA.BB.CC.DD, transmitting station 11 knows that a listener is present (the multicast is enabled) at receiving station 121, and transmits the multicast packet from multicast transmission terminal 4a to receiving station 121. Receiving station 121 (multicast receiving terminal 4b) receives this multicast packet.

The <multicast delivery destination table 3> illustrates that receiving station 122 has further added the information indicating that the multicast is disabled at receiving station 122. Receiving station 122 communicates with transmitting station 11 so that the information, indicating that the multicast is disabled at receiving station 122, is registered. Stated differently, receiving station 122 is not registered with multicast delivery destination table 141. When a multicast packet needs to be transmitted to the multicast address AA.BB.CC.DD, transmitting station 11 then refers to multicast delivery destination table 141. Since receiving station 121 is registered for the multicast address AA.BB.CC.DD, transmitting station 11 knows that a listener is present at receiving station 121, and transmits the multicast packet from multicast transmission terminal 4a to receiving station 121. Receiving station 121 (multicast receiving terminal 4b) receives the multicast packet. Consequently, no unnecessary the multicast packet, as is, is transmitted to receiving station 122 over communications link 5.

The <multicast delivery destination table 4> illustrates that multicast receiving terminal 4b connected to receiving station 123 is additionally registered as a listener for the multicast address AA.BB.CC.DD. Initially, receiving station 123 communicates with transmitting station 11 and has multicast delivery destination table 141 updated so that the information indicating that the multicast is enabled at receiving station 123 is registered for the multicast address AA.BB.CC.DD. When a multicast packet needs to be transmitted to the multicast address AA.BB.CC.DD, transmitting station 11 then refers to multicast delivery destination table 141. Since receiving station 121 and receiving station 123 are registered for the multicast address AA.BB.CC.DD, transmitting station 11 knows that a listener is present (the multicast is enabled) at receiving station 121 and receiving station 123, and transmits the multicast packet from multicast transmission terminal 4a to receiving station 121 and receiving station 123. Receiving station 121 (multicast receiving terminal 4b) and receiving station 123 (multicast receiving terminal 4b) receive this multicast packet. Consequently, no unnecessary multicast packet itself is transmitted to receiving station 122 over communications link 5.

As such, the communication system, the communication method, the multicast delivery destination designation method, the transmitting station, and the receiving station according to Embodiments 1 and 2 transmit, in the satellite communications system which performs the multicast communication, a multicast packet only to a receiving station that needs to receive the multicast packet, and an amount of multicast packet transfer to receiving stations that do not need to receive the multicast packet is thus reduced, thereby allowing effective utilization of the bandwidth of the satellite links. Specifically, the transfer of unnecessary multicast packet to the receiving stations is reduced, thereby allowing effective utilization of the bandwidth of the satellite links.

Thus, since the communication system, the communication method, the multicast delivery destination designation method, the transmitting station, and the receiving station, according to Embodiments 1 and 2, do not transfer a multicast packet to receiving destinations that do not need to receive the multicast packet, the bandwidth of the satellite links can be effectively utilized. Consequently, there is no need for the method in which the multicast packet is transferred to all the receiving stations connected to the satellite links and the receiving station discards the multicast packet if the receiving station does not need the packet. For example, the number of communications bands for the satellite links is often less than the number of links within ground equipment, and such a case is less likely to occur that a multicast packet is transferred to receiving stations that do not need to receive the packet and the bandwidth of the satellite links is constrained.

REFERENCE SIGNS LIST 1 earth station (transmitting station, receiving station); 11 transmitting station; 12 receiving station; 2 satellite (satellite station); 3 control station; 31 DAMA control unit (DAMA controller, DAMA control device); 32 control channel modem; 33 control channel (CSC channel); 4 communication terminal; 4a multicast transmission terminal; 4b multicast receiving terminal; 5 communications link (satellite link); 121 to 12n receiving station; 13 transmitting station transceiver unit (transceiver unit, transmitting station transceiver, transceiver); 14 delivery destination table storage unit (storage unit, delivery destination table memory device, memory device); 141 multicast delivery destination table; 15 communication modem (modem); 16 satellite gateway (satellite GW), 17 earth station control unit (earth station controller, earth station control device); 17b control station control unit (control station control device); 18 receiving station transceiver unit (transceiver unit, receiving station transceiver, transceiver); 18b control station control unit (control station controller, control station control device); 19 delivery destination designation information storage unit (storage unit, delivery destination designation information memory device, memory device); 191 delivery destination designation information, 20 communication modem (modem); 21 satellite gateway (satellite GW); and 22 earth station control unit (earth station controller, earth station control device).

The invention claimed is:

1. A multicast delivery destination designation method for designating a delivery destination between a transmitting station which performs a multicast transmission via a satellite and a plurality of receiving stations, the multicast delivery destination designation method comprising:

a delivery destination designating step of transmitting delivery destination designation information from the receiving station to the transmitting station through a satellite communication link allocated to each of the plurality of receiving stations, the delivery destination designation information pertaining to a multicast address to which per-multicast-address delivery is requested by a communication terminal connected to the receiving station;

a delivery destination table generating step of generating, by the transmitting station, a multicast delivery destination table, in which a multicast address to which the delivery is requested by the communication terminal is associated with the receiving station transmitting the delivery destination designation information through the satellite communication link from the delivery destination designation information received from the plurality of receiving stations, wherein the transmitting station associates only multiple receiving stations, to each of which a satellite communication link is allocated, to a single multicast address within a single entry in the multicast delivery destination table, without including identification of the communication terminal that requested the delivery, when receiving separate transmissions of delivery destination designation information, pertaining to the same single multicast address, from separate receiving stations;

a delivery destination referencing step of referring to the multicast delivery destination table when the transmitting station performs the multicast transmission via the satellite; and a delivery step of transmitting a multicast packet from the transmitting station to only one or more receiving stations through one or more respective satellite communication links allocated to the one or more receiving stations, the one or more receiving stations each being a delivery destination obtained from the multicast delivery destination table referred to in the delivery destination referencing step.

2. The multicast delivery destination designation method according to claim 1, wherein
the delivery step includes discarding the multicast packet when no delivery destination is obtained from the multicast delivery destination table referred to in the delivery destination referencing step.

3. The multicast delivery destination designation method according to claim 1, wherein
the delivery destination designating step is performed at least after the satellite communications links have been established between the transmitting station and the plurality of receiving stations via the satellite.

4. The multicast delivery destination designation method according to claim 3, wherein
the delivery destination designating step is performed during an initial communication after the satellite communications links have been established.

5. The multicast delivery destination designation method according to claim 1, wherein
the delivery destination designating step is performed each time the delivery destination designation information is changed.

6. A transmitting station for performing multicast transmission to a plurality of receiving stations via a satellite, the transmitting station comprising:
a transmitting station transceiver that receives delivery destination designation information from the plurality of receiving stations through satellite communication links each allocated to each of the plurality of receiving stations, the delivery destination designation information pertaining to a multicast address to which per-multicast-address delivery is requested by a communication terminal connected to the receiving station;

a delivery destination table memory device that, based on the delivery destination designation information received from the plurality of receiving stations, generates and stores a multicast delivery destination table in which a multicast address to which the delivery is requested by the communication terminal is associated with the receiving station transmitting the delivery destination designation information, through the satellite communication link, wherein the transmitting station associates only multiple receiving stations, to each of which a satellite communication link is allocated, to a single multicast address within a single entry in the multicast delivery destination table, without including identification of the communication terminal that requested the delivery, when receiving separate transmissions of delivery destination designation information, pertaining to the same single multicast address, from separate receiving stations, wherein the transmitting station transceiver refers to the multicast delivery destination table and transmits a multicast packet from the transmitting station to only one or more receiving stations through one or more respective satellite communication links allocated to the one or more receiving stations, the one or more receiving stations each being a delivery destination obtained from the multicast delivery destination table.

7. The transmitting station according to claim 6, wherein the transmitting station transceiver discards the multicast packet when the transmitting station transceiver refers to the multicast delivery destination table and no delivery destination is present.

8. The transmitting station according to claim 6, wherein the transmitting station transceiver receives the delivery destination designation information at least after the satellite communications link has been established between the transmitting station and the receiving station via the satellite.

9. The transmitting station according to claim 8, wherein the transmitting station transceiver receives the delivery destination designation information during an initial communication after the satellite communications link has been established.

* * * * *